United States Patent [19]

Vogel

[11] Patent Number: 5,246,270
[45] Date of Patent: Sep. 21, 1993

[54] PASSENGER SEAT ARRANGEMENT

[75] Inventor: Ignaz Vogel, Karlsruhe, Fed. Rep. of Germany

[73] Assignee: Ignaz Vogel GmbH & Co. KG, Karlsruhe, Fed. Rep. of Germany

[21] Appl. No.: 812,721

[22] Filed: Dec. 23, 1991

[30] Foreign Application Priority Data

Dec. 24, 1990 [DE] Fed. Rep. of Germany ... 9017470[U]
Oct. 21, 1991 [EP] European Pat. Off. ........ 91117903.4

[51] Int. Cl.$^5$ .............................................. A47C 7/02
[52] U.S. Cl. ................................. 297/232; 297/248; 297/344.1; A47C/7/02
[58] Field of Search ............... 297/232, 248, 249, 257, 297/344, 440, 442, 445

[56] References Cited

U.S. PATENT DOCUMENTS

| | | | |
|---|---|---|---|
| 3,702,204 | 11/1972 | Tipton et al. | 297/248 |
| 3,785,600 | 1/1974 | Padovano | 297/248 X |
| 4,091,479 | 5/1978 | Hancock | 297/344 X |
| 4,126,354 | 11/1978 | Delong et al. | 297/248 |
| 4,277,101 | 7/1981 | Vogel | 297/232 |
| 4,422,691 | 12/1983 | Vogel | 297/232 X |
| 4,761,036 | 8/1988 | Vogel | 297/232 X |
| 5,098,156 | 3/1992 | Vogel | 297/344 X |

Primary Examiner—Laurie K. Cranmer
Attorney, Agent, or Firm—Klaus J. Bach

[57] ABSTRACT

In a passenger seat arrangement a passenger seat with backrest is arranged movably on a support structure including two side support bases and a mounting beam structure extending across the support bases and having spaced box frame members including T-shaped grooves, the seat is mounted on bearing structures disposed in the grooves of the box frame members thereby providing for the movability of the seat relative to an adjacent seat mounted on the same support structure for adjustability of the seat spacing without obstruction of the leg room underneath the seats.

11 Claims, 6 Drawing Sheets

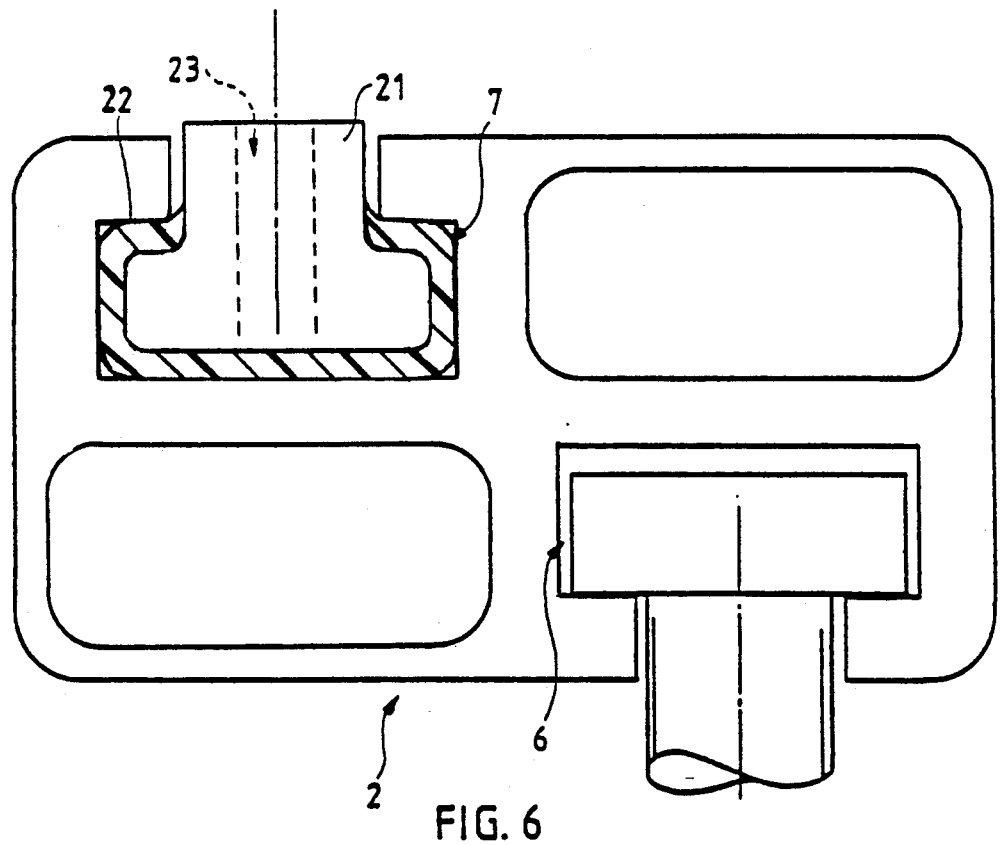
FIG. 6
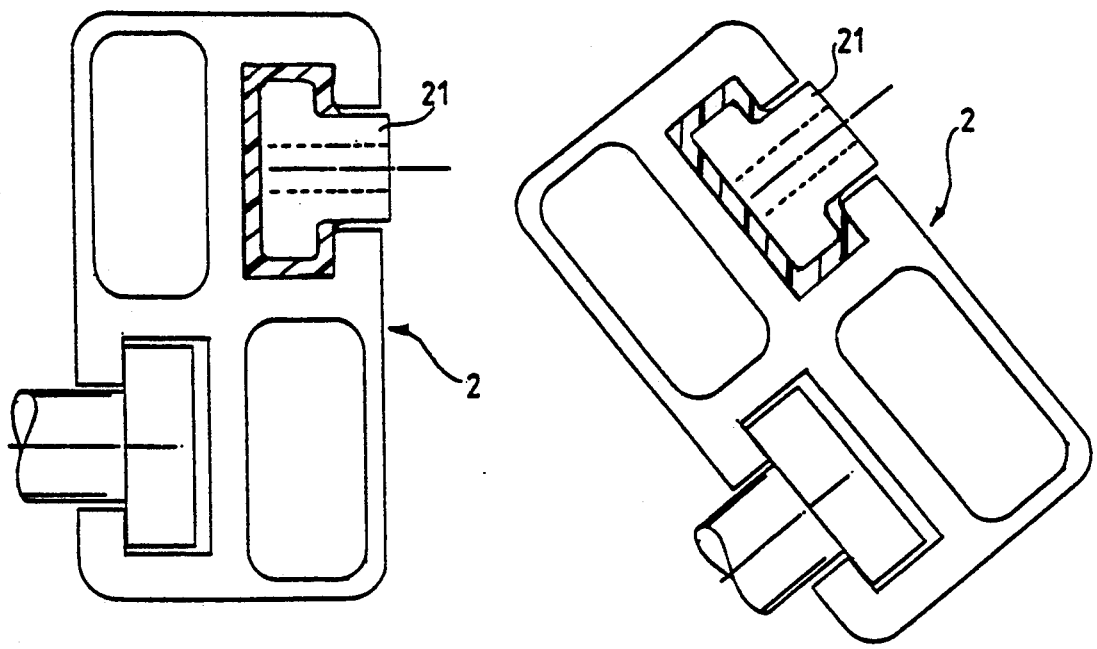
FIG. 7
FIG. 8

PASSENGER SEAT ARRANGEMENT

BACKGROUND OF THE INVENTION

The invention relates to a passenger seat arrangement wherein the two seats are supported side-by-side on a support base which consists of box section frame members on which one of the twin seats is firmly mounted whereas the other is sidewardly movable for adjustment of the spacing between the two seats.

Such box section frame members are utilized particularly in buses where the firmly mounted seat is located adjacent the side (window) wall of the bus and the inner movably supported seat is located adjacent the aisle. Sideward movability of the inner seat permits adjustment of the distance between the window seat and the aisle seat for increased comfort of the passengers during travel at the expense of aisle space. During boarding and unboarding however the seats must be moved together to facilitate passenger traffic through the aisle between the seats.

The structure allowing for side movability of the seats however is relatively expensive and is used therefore only in connection with more luxurious seating. Luxurious seats are generally quite heavy since they are provided not only with better and heavier upholstery than standard seats but they also have, for example, tiltable backrests and leg rests and other devices which provide for increased comfort but which all together substantially increase the weight of such seats. During sudden deceleration, for example, during an accident, the weight that is the mass of these seats must be accommodated by the seat itself and also its support base. It also is to be taken into consideration that, during such sudden deceleration, specifically during and after an accident, the space between the backrests of a seat and the seat ahead becomes the survival space for a passenger. It is therefore necessary to retain passengers, who, during rapid deceleration, are projected forwardly toward the backrest of the seat ahead, in such a manner that energy is consumed in order to avoid injuries as much as possible. Generally, the backrest of the seat ahead is designed to fulfill this need but this requires that the support base is sufficiently strong to retain the seat thereby permitting the backrest to fulfill its energy absorbing design purpose. It also requires that, for sidewardly movable seats, the seat support bearing structure providing for the transverse movability is capable of accommodating the large forces effective during an accident generally in a direction normal to the seat support bearing providing for seat sideward movability.

In present arrangements the box section frame members of the bases of such twin seats are either offset such that the upper side of the transverse bearing structure disposed on the inner offset frame member portion is at the same level as the outer portion of the frame member so that both seats mounted on the support base have the same height, or the box section frame members are straight and spacers are disposed under the firmly mounted seat in order to compensate for the height of the transverse bearing structure. Both arrangements reduce the leg room for the passengers behind and therefore impair the comfort of these passengers.

It has already been pointed out that the transverse bearing structures needed for the lateral movement of the passenger seat are subjected to large forces effective in a direction normal to their longitudinal extent. Since the box section frame members mounted on the support bases can be considered to be a fixed anchorage structure, the transverse bearings need to be designed for the tilting torque which increases exponentially with increasing seat height over the transverse bearing structure. This requires the transverse bearing structure to be very rigid so that they become quite expensive and also quite heavy which increases the dead weight of the structure. In addition the transverse bearings should be rattle-free under any circumstances, whether they are or are not under load. In order to meet all these requirements these transverse bearings have always been of a rigid, heavy and expensive design.

It is the object of the present invention to provide for a seat support arrangement which permits elimination of the heavy and expensive transverse seat support bearings.

SUMMARY OF THE INVENTION

In a passenger seat arrangement wherein two passenger seats with backrests are arranged in side-by-side relationship so as to be movable relative to one another on a support structure which includes two side support bases and a mounting beam structure extending across the support bases and having spaced box frame members including T-shaped mounting grooves, one of the seats being firmly mounted onto the box frame members by means anchored in the grooves, the other seat is mounted on a linear bearing structure disposed in the grooves thereby providing for the relative movability of the seats for the adjustment of seat spacing without obstruction of the leg room underneath the seats.

In this arrangement the transverse linear bearing structures are not mounted onto the box frame members but they are received within the box frame members, that is, they are disposed within the fixed anchorage structure so that any forces effective in driving direction such as acceleration and deceleration forces are taken up mainly directly by the box frame members and only to a small degree by the transverse linear bearing structures. The transverse linear bearing can therefore be of lightweight design as their main purpose now is to provide guidance for the seat whereas any strong forces applied to the seats are taken up directly by the box frame members. The arrangement further provides for cost reducing advantages since it is no longer necessary to provide for offsets in the box frame members or to provide spacers for the firmly installed seat. Furthermore, it is considered to be a distinctive advantage, particularly for luxury type seats, that the leg room height is increased about by the height of the transverse linear bearing. All together there are not only design advantages but there are also the advantages of reduced weight and costs.

It is, of course, necessary that the transverse linear bearing structures fit into the box frame member's T-shaped mounting grooves. This requires a relatively flat linear bearing design which, however, is not quite acceptable since the bearing structure is now subjected only to relatively small forces. The transverse linear bearing structures may be friction or antifriction bearings which use as bases directly the walls defining the T-shaped mounting grooves or they may use support plates received in the T-shaped mounting grooves. In order to prevent rattling of the bearing structure a slightly elastic intermediate layer is disposed between the groove walls and such support plates. The intermediate layer may be a transversely curved leaf spring of steel or plastic or it may be a plastic elastomer. Also other devices and materials may be used as bearing structures, such as resilient slide pads filled with a lubricant such as molybdenum disulfate or other materials which reduce friction, particularly the static friction.

The elastomer or resilient intermediate layers prevent rattling of the bearing structure when the seat is not occupied since the resilient inserts engage the transverse bearing structures with the walls of the T-shaped mounting grooves.

The twin passenger seat arrangement in accordance with the invention reduces dead weight, it simplifies assembly no matter how the grooves in the box frame members are oriented, it provides for rattle-free support of the seats and it is relatively inexpensive.

BRIEF DESCRIPTION OF THE DRAWINGS

FIG. 6 shows another embodiment in which a resilient plastic liner is provided as the bearing structure;

FIGS. 7 and 8 are an arrangement like that of FIG. 6 but with the box frame member disposed at different orientations;

DESCRIPTION OF THE PREFERRED EMBODIMENTS

Figure 1:
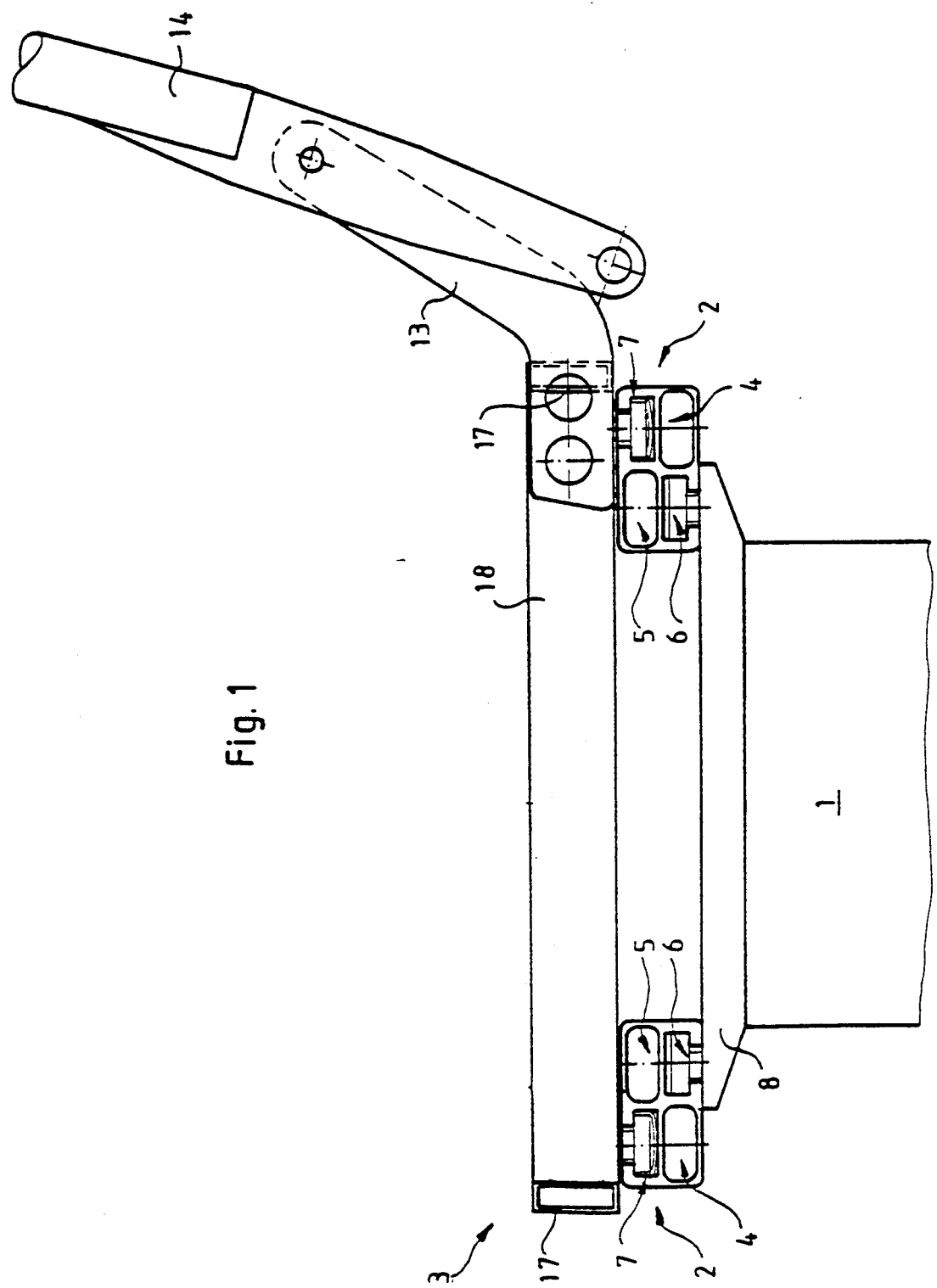
FIG. 1 is a side view of a passenger seat support frame.

FIG. 1 shows mounting beams consisting of box frame members 2 supported on side support bases 1, 8. The mounting beams 2 consist of box frame members of oblong cross-section with two partial box structures 4, 5 and lower and upper T-shaped mounting grooves 6, 7. The lower T-shaped box structure 6 receives the heads of square-head mounting bolts by which the mounting beams are mounted on the mounting structure 8 of the base structure 1, 8. The upper T-shaped mounting groove 7 receives the same kind of square-head bolts projecting upwardly for the mounting of the seat member 3 which includes rectangular beams 17, 18 with linear bearing structures as shown in FIGS. 2 to 7, to which the seat member is mounted. The seat member 3 includes neck portions 13 on which the backrest 14 is pivotally mounted.

Figure 2:
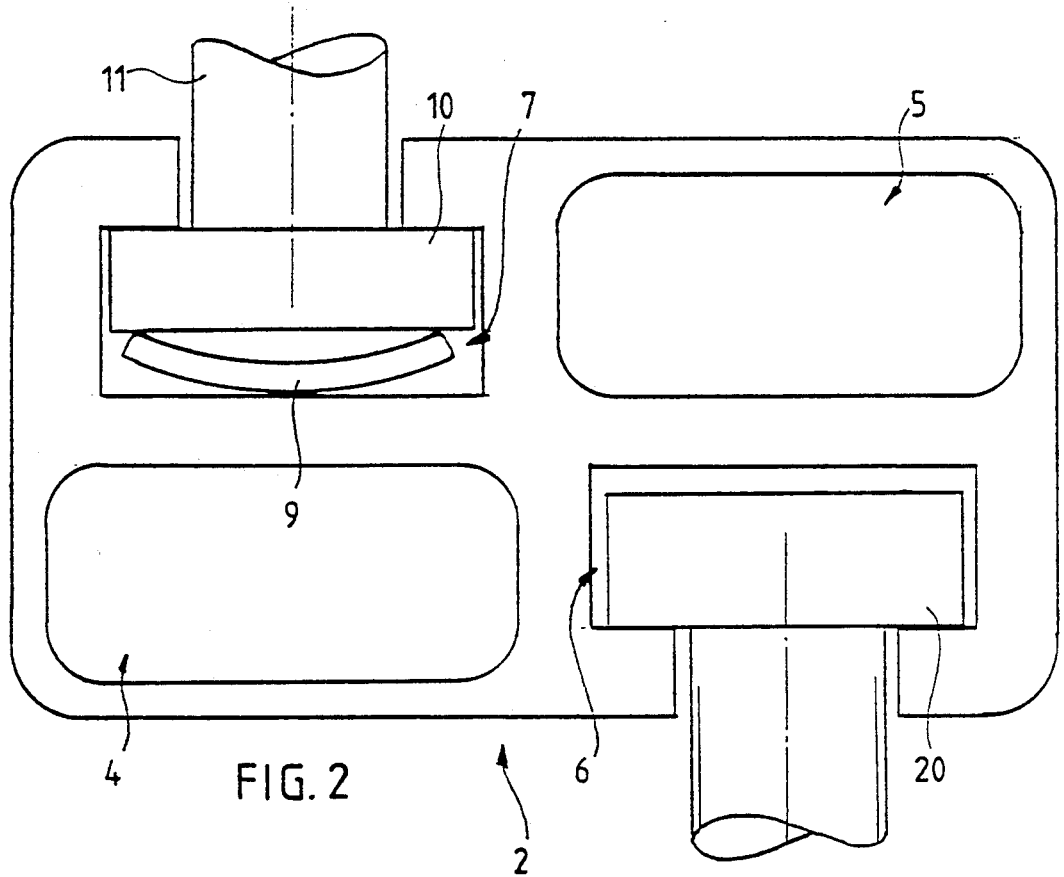
FIG. 2 is a cross-sectional view of a transverse box frame member with the seat unoccupied.

A first embodiment of a transverse bearing disposed within a mounting beam 2 is shown in FIG. 2. It includes in its mounting groove 7 friction bearing strips 9 which are slightly bent and preferably consist of plastic. They may be slide pads filled with a lubricant. Disposed on these bearing strips 9 are support rails 10 which are connected to the seat member 3 by means of bolts 11.

Figure 3:
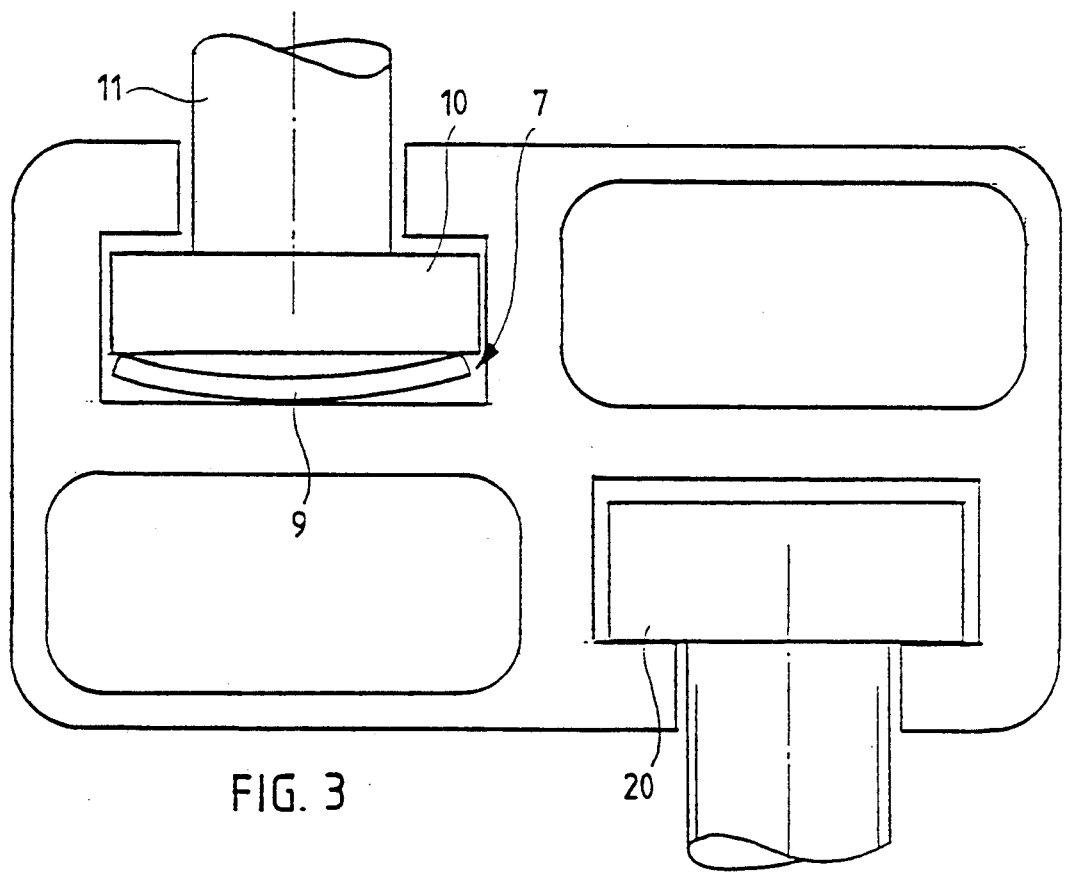
FIG. 3 is the same view as FIG. 2 however with the seat occupied.

FIG. 2 shows the arrangement with the seat unoccupied wherein the bent resilient bearing strips 9 press the support rails 10 against the upper walls of the T-shaped mounting grooves 7. This safely prevents rattling of the transverse linear bearing structures and of the seat. FIG. 3 shows the same arrangement with the seat downloaded. In that case, the bearing strip 9 is compressed so that the upper side of the support rail 10 is disengaged from the upper wall of the T-shaped mounting groove 7. In that condition the seat which is connected to the support rail 10 by way of the bolts 11 may be moved without difficulties.

Figure 4:
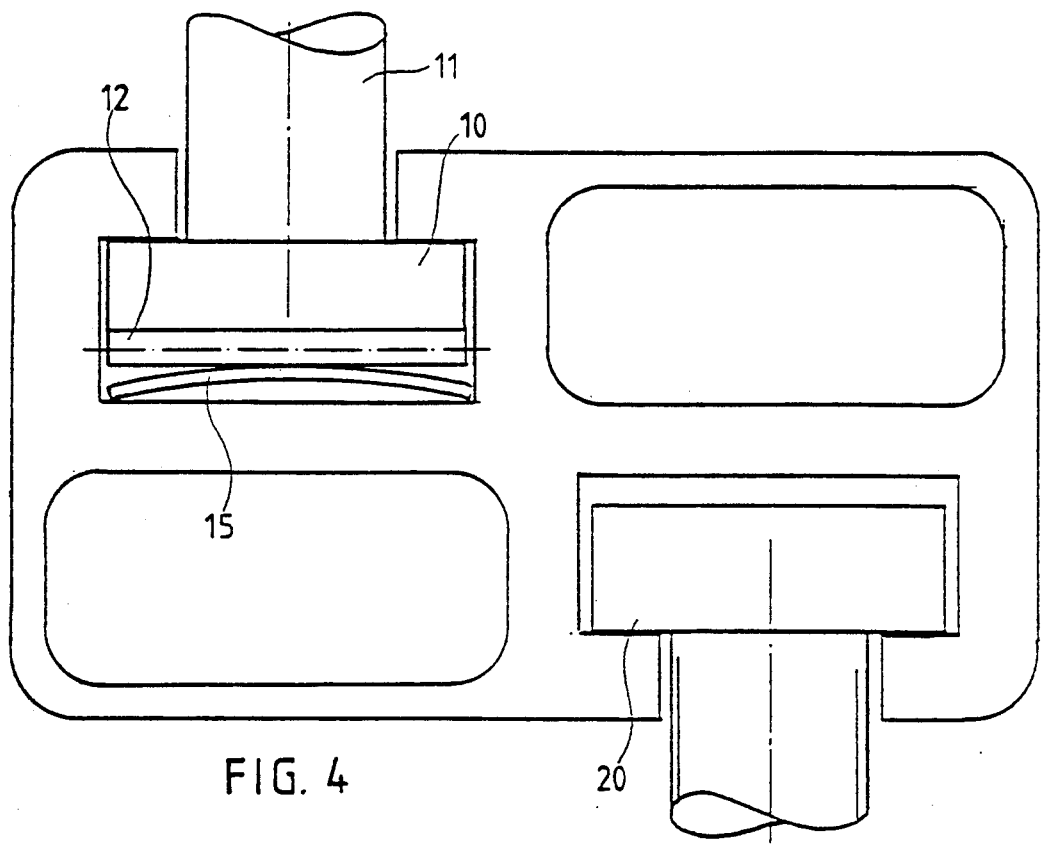
FIG. 4 shows the arrangement of FIG. 2 including a linear roller bearing and leaf spring.

FIG. 4 shows in the same manner of presentation as FIGS. 2 and 3 an arrangement with a needle bearing 12 which supports the support rail 10 and which is supported on the leaf spring 15. Again, in this arrangement, the support of the needle bearing 12 by the leaf spring 15 causes the support rail 10 to be pressed against the upper walls of the T-shaped mounting groove 7 thereby preventing rattling. With downloaded seat, the leaf spring 15 is compressed so that movement of the seat becomes possible.

Figure 5:
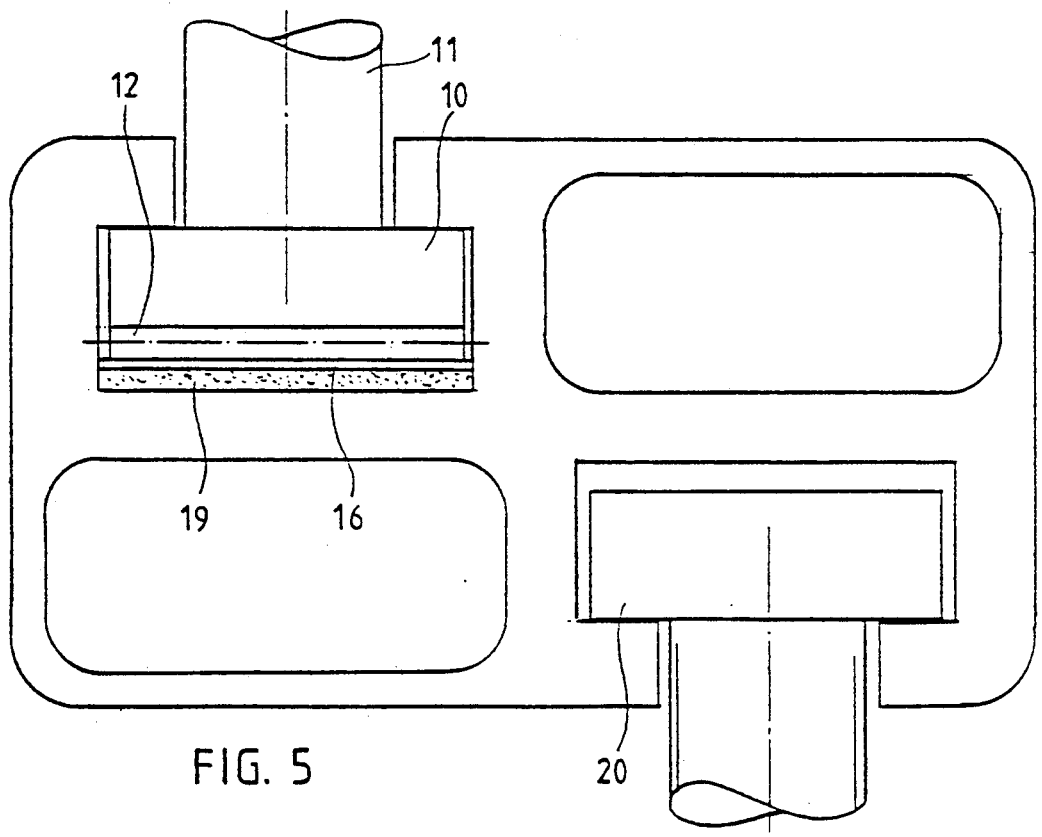
FIG. 5 shows an arrangement similar to that of FIG. 4, however with a resilient plastic insert in place of the leaf spring.

FIG. 5 shows a bearing plate 16 supporting the needle bearing 12 on top of an elastomer layer 19 or slide pads providing for the same effect, that is, that, with unloaded seat, the upper side of the support rail 10 is pressed against the upper wall of the T-shaped mounting groove 7 thereby preventing rattling of the seat, whereas, with downloaded seat, the elastomer layer 19 or slide pad is compressed so that sliding of the seat becomes possible.

FIG. 6 shows another embodiment of a mounting beam with a transverse bearing structure wherein the T-shaped head of a support rail is fully surrounded by a slightly resilient material 22 with low friction coefficient, preferably a plastic material. The material 22 should be specifically so selected as to provide for little static friction between it and the surrounding walls of the T-shaped mounting groove 7. The T-shaped head 21 includes a threaded bore 23 for the reception of mounting bolts for the seat structure 3.

FIG. 7 shows the same mounting beam 2 but arranged upright, which arrangement provides for increased bending resistance during loading.

FIG. 8 shows the same mounting beam but arranged in tilted position.

Figure 9:
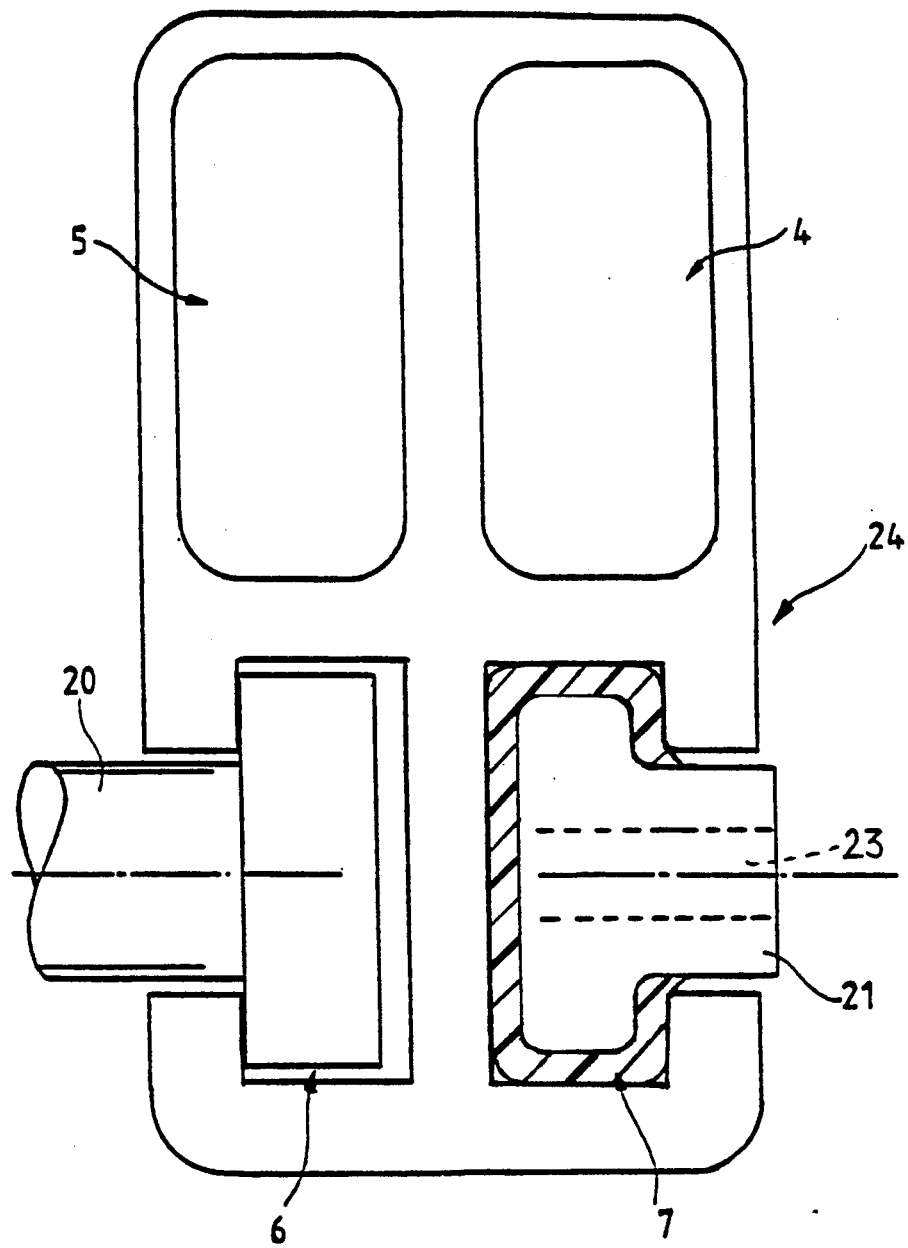
FIG. 9 shows a box frame member with the box structures at one side thereof.

FIG. 9 shows a mounting beam 24 wherein the two T-shaped mounting grooves 6, 7 are both arranged side-by-side and the box profiles 4, 5 are arranged above the mounting grooves 6, 7. This arrangement also provides for high bending resistance and, as a result of the low location of the T-shaped head 21 with respect to the mounting bolt 20, for reduced rotational torque forces on the mounting beam when forces are applied transverse to the mounting beam 24.

In all the cases described the mounting beam 2 is mounted onto the mounting structure 8 of the base structure 1 by way of the square head bolts 20 disposed in the T-shaped mounting groove 6.

Figure 10:
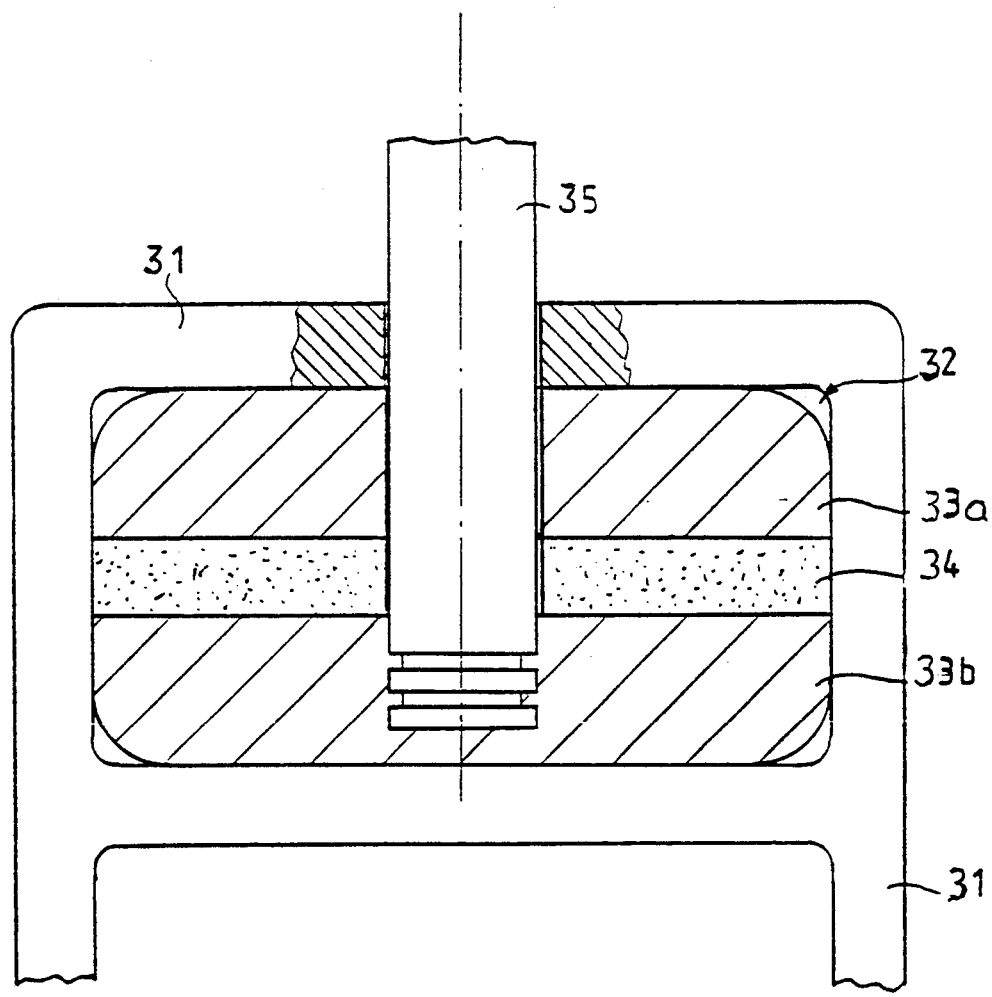
FIG. 10 shows another linear bearing arrangement.

As shown in FIG. 10 the resilient structure may also be disposed within the support rail 31 which then consists of two slide member parts 33a, 33b disposed in the T-shaped mounting groove 32 of the mounting beam 31. A layer of elastomer material 34 is disposed between the two slide members 33a, 33b. Firmly anchored within the slide member part 33b is a bolt 35 which projects therefrom for slidably mounting the passenger seat onto the support rail 31.

The slide members 33a, 33b consist preferably of polytetrafluoroethylene which, with respect to the support rail 31 which is anodized, has relatively low friction. This provides for relative easy movement of the slide members 33a, 33b within the T-shaped groove 32 and, of course, of the passenger seat mounted on the slide members 33a, 33b via bolt 35. A resilient structure such as a spring strip or an elastomer material layer 34 disposed between the slide member parts 33a, 33b firmly engages the two slide members 33a, 33b with the adjacent walls of the T-shaped groove thereby preventing rattling of the slide members 33a, 33b.

What is claimed is:

1. A passenger seat arrangement comprising a seat having a backrest and being arranged on a support structure including two side support bases and a mounting beam structure comprising spaced box frame members extending across said two support bases, each including a T-shaped mounting groove, and bearing structures including support rails disposed in said T-shaped grooves for slidably supporting said seat so as to permit movement of said seat on said box frame members for adjustment of the spacing between adjacent seats, said T-shaped mounting grooves having walls defining bases for said bearing structures, said support rails resting on leaf springs bent slightly about their longitudinal axes and disposed in said mounting grooves.

2. A passenger seat arrangement according to claim 1, wherein antifriction bearing means are disposed between said support rails and said leaf springs.

3. A passenger seat arrangement comprising a seat having a backrest and being arranged on a support structure including two side support bases and a mounting beam structure comprising spaced box frame members extending across said two support bases, each having a T-shaped mounting groove, said seat having a bearing structure including support rails disposed on antifriction bearings received in said T-shaped grooves for slidably supporting said seat on said box frame members so as to permit movement of said seat for adjustment of the spacing between it and an adjacent seat and bearing plates disposed between the antifriction bearings and walls of the T-shaped grooves with resilient strips arranged between the bearing plates and the walls of the T-shaped grooves.

4. A passenger seat arrangement comprising a seat having a backrest and being arranged on a support structure including two side support bases and a mounting beam structure comprising spaced box frame members extending across said two support bases, each having a T-shaped mounting groove, said seat having a bearing structure including support rails received in said T-shaped grooves for slidably supporting said seat on said box frame members so as to permit movement of said seat for adjustment of the spacing between it and an adjacent seat, and slide pads disposed on the lower side of said support rails in said T-shaped grooves so as to provide friction bearings for said support rails in said mounting grooves.

5. A passenger seat arrangement according to claim 4, wherein said slide pads consist of plastic material.

6. A passenger seat arrangement according to claim 5, wherein said slide pads are filled with a lubricant, particularly molybdenum sulfide.

7. A passenger seat arrangement according to claim 5, wherein said slide pads are of curved shape providing for some resiliency.

8. A passenger seat arrangement according to claim 4, wherein said bearing structures extending into said T-shaped grooves comprise spaced slide members having a layer of elastomer material disposed therebetween adapted to resiliently engage said slide members with the walls of said T-shaped grooves.

9. A passenger seat arrangement according to claim 8, wherein said spaced slide members consist of plastic material having a low friction coefficient, particularly polytetrafluoroethylene.

10. A passenger seat arrangement according to claim 8, wherein said box frame members consist of aluminum having walls defining said T-shaped grooves and at least the walls of said T-shaped grooves are anodixed so as to provide for smooth low-friction surfaces.

11. A passenger seat arrangement according to claim 8, wherein a spring strip is disposed between said spaced slide members.

* * * * *